No. 714,723. Patented Dec. 2, 1902.
J. W. MACY.
ROAD GRADER.
(Application filed May 9, 1902.)
(No Model.) 2 Sheets—Sheet 1.
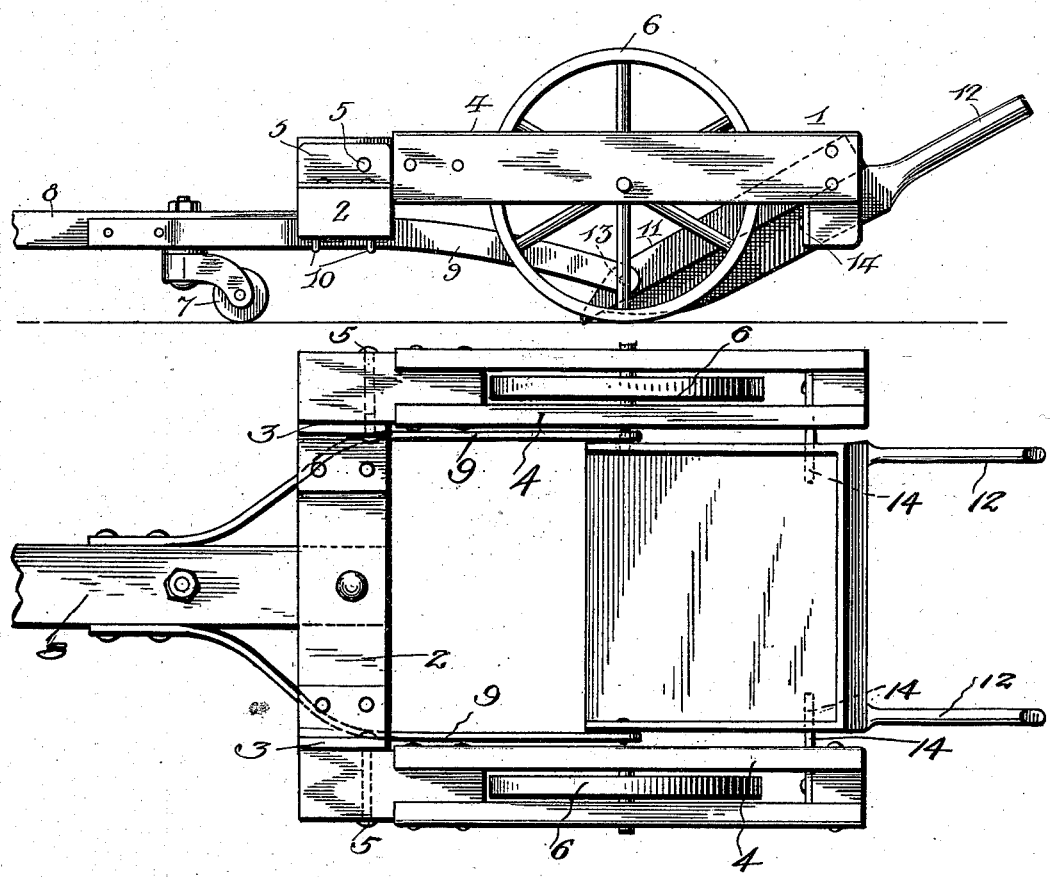
Witnesses
Inventor
Jason W. Macy
By
Attorneys No. 714,723. Patented Dec. 2, 1902.
J. W. MACY.
ROAD GRADER.
(Application filed May 9, 1902.)
(No Model.) 2 Sheets—Sheet 2.
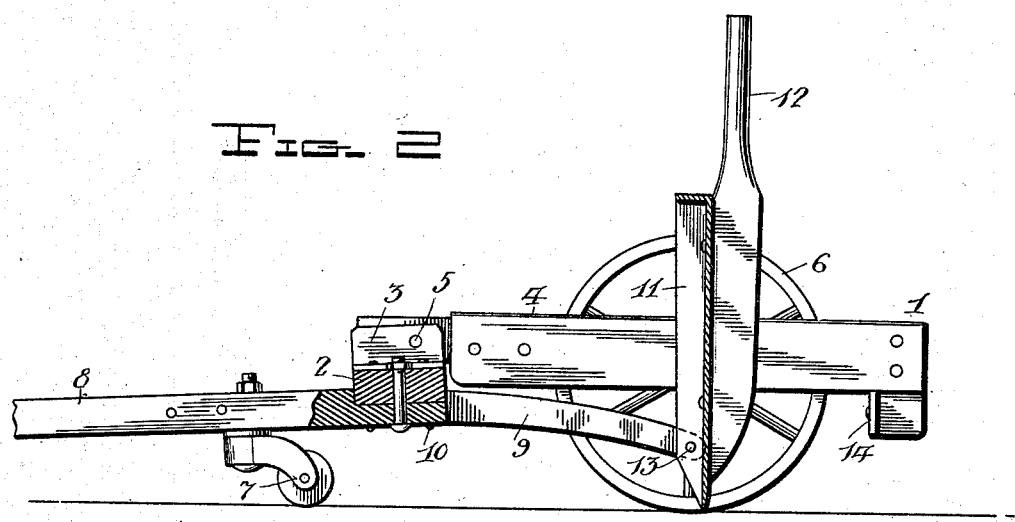
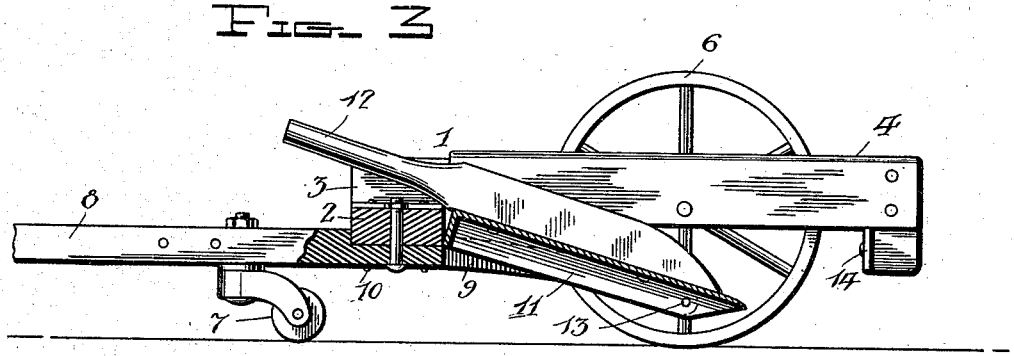
Inventor
Jason W. Macy
Witnesses
By H. B. Willson & Co.
Attorneys

UNITED STATES PATENT OFFICE.

JASON W. MACY, OF BEACON, IOWA.

ROAD-GRADER.

SPECIFICATION forming part of Letters Patent No. 714,723, dated December 2, 1902.

Application filed May 9, 1902. Serial No. 106,532. (No model.)

*To all whom it may concern:*

Be it known that I, JASON W. MACY, a citizen of the United States, residing at Beacon, in the county of Mahaska and State of Iowa, have invented certain new and useful Improvements in Road-Graders; and I do declare the following to be a full, clear, and exact description of the invention, such as will enable others skilled in the art to which it appertains to make and use the same.

The invention relates to road-graders.

The object of the invention is to provide a machine of this character which shall be simple of construction, durable in use, comparatively inexpensive of production, efficient in action, and which in the tilting of the scoop will not require the operator to lift the weight of the machine, as is the case in the form of road-graders now in use.

With these and other objects in view the invention consists in certain novel features of construction, combination, and arrangement of parts, which will be hereinafter more fully set forth, and particularly defined in the appended claims.

In the accompanying drawings, Figure 1 is a side elevation of my improved road-grader, showing the scoop or shovel in position for use. Fig. 2 is a longitudinal vertical sectional view illustrating the position of the parts when the shovel is being tilted for dumping and has reached a vertical position. Fig. 3 is a similar view after the shovel has been tilted, and Fig. 4 is a top plan view of the machine.

In the drawings, 1 denotes the main frame, which consists of the horizontally-extending front piece 2, provided at its ends with brackets 3, in which are pivoted the side pieces 4 by a transverse pivot 5.

6 denotes supporting-wheels journaled in the side pieces, and 7 denotes the forward supporting wheel or caster, swiveled to the draft tub or bar 8.

9 denotes draw-bars, the forward ends of which are bolted to the draft-tub, and these bars are curved laterally and extend rearwardly under the front cross-piece of the frame and are connected to said cross-piece by staples 10.

11 denotes a scoop or shovel provided with handles 12, projecting from its rear end. The forward lower end of the scoop or shovel is pivoted to the draw-bars 9 by pivots 13, thus putting all the strain of draft directly upon the tongue and removing it from the frame. The rear end of the shovel or scoop is supported by laterally-projecting brackets 14, which hold the scoop in the inclined position shown in Fig. 1 of the drawings.

The operation of the machine is as follows: After it has been filled and it is desired to discharge its contents the handles are grasped and forced upwardly. In this upward movement of the handles the lower edge of the scoop or shovel is brought into firm contact with the ground, which acts as a fulcrum upon which the shovel is turned. Heretofore at the instant upward pressure was applied to the handles of the shovel in the act of tilting the shovel the fixed side pieces of the main frame, together with their supporting-wheels, would be elevated, thus requiring the operator to lift the combined weight of the load, shovel, side pieces, and frame. By hinging or pivoting the side pieces of the frame to the forward cross-piece thereof as the handles are moved upwardly in the act of tilting the shovel the play of the side pieces will allow the wheels to remain in contact with the ground, and thus support the weight of the side pieces and frame, thus relieving the operator of the necessity of lifting the weight of the side pieces and the wheels, as heretofore he has been required to do.

In Fig. 1 of the drawings the shovel or scoop is shown in position to scrape up the earth, and in this figure it will be noted that the supporting-wheels are in contact with the ground. In Fig. 2 the shovel is shown in a vertical position, just in the act of swinging forwardly of a vertical line to discharge its contents. It will be observed that in this position the supporting-wheels are shown upon the ground, so that in moving the shovel from the position shown in Fig. 1 to that shown in Fig. 2 the weight of the supporting-wheels and side pieces is not lifted by the operator.

From the foregoing description, taken in connection with the accompanying drawings, the construction, operation, and advantages of my invention will be readily apparent, it is thought, without requiring a more extended explanation.

Various changes in the form, proportion, and minor details of construction may be resorted to without departing from the principle or sacrificing any of the advantages of my invention.

Having thus described my invention, what I claim, and desire to secure by Letters Patent, is—

In a road-grader, the combination with the main frame embodying in its construction a front piece and side pieces hinged to the front piece to swing in a vertical plane, and supporting-wheels journaled to the side pieces, of draw-bars connected to the front of the main frame, and a scoop or shovel pivoted to said bars, substantially as set forth.

In testimony whereof I have hereunto set my hand in presence of two subscribing witnesses.

JASON W. MACY.

Witnesses:
  J. N. WILLIS,
  JAMES O. GRANT.